United States Patent
Satow et al.

(10) Patent No.: US 10,128,495 B2
(45) Date of Patent: Nov. 13, 2018

(54) POSITIVE ELECTRODE FOR NONAQUEOUS ELECTROLYTE SECONDARY BATTERY AND NONAQUEOUS ELECTROLYTE SECONDARY BATTERY THAT USES THE POSITIVE ELECTRODE

(71) Applicant: SANYO Electric Co., Ltd., Daito-shi, Osaka (JP)

(72) Inventors: Taiki Satow, Hyogo (JP); Takao Kokubu, Hyogo (JP); Taizou Sunano, Hyogo (JP); Takeshi Ogasawara, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 510 days.

(21) Appl. No.: 14/654,142

(22) PCT Filed: Jan. 23, 2014

(86) PCT No.: PCT/JP2014/000328
§ 371 (c)(1),
(2) Date: Jun. 19, 2015

(87) PCT Pub. No.: WO2014/132550
PCT Pub. Date: Sep. 4, 2014

(65) Prior Publication Data
US 2016/0013478 A1  Jan. 14, 2016

(30) Foreign Application Priority Data

Feb. 28, 2013  (JP) ................................. 2013-038065

(51) Int. Cl.
| | | |
|---|---|---|
| H01M 4/36 | (2006.01) | |
| H01M 4/505 | (2010.01) | |
| H01M 4/525 | (2010.01) | |
| H01M 4/58 | (2010.01) | |
| H01M 4/1315 | (2010.01) | |
| H01M 4/485 | (2010.01) | |
| H01M 10/0525 | (2010.01) | |
| H01M 4/38 | (2006.01) | |
| H01M 10/052 | (2010.01) | |
| H01M 4/02 | (2006.01) | |

(52) U.S. Cl.
CPC ......... *H01M 4/366* (2013.01); *H01M 4/1315* (2013.01); *H01M 4/364* (2013.01); *H01M 4/485* (2013.01); *H01M 4/505* (2013.01); *H01M 4/525* (2013.01); *H01M 4/582* (2013.01); *H01M 10/0525* (2013.01); *H01M 4/38* (2013.01); *H01M 10/052* (2013.01); *H01M 2004/028* (2013.01)

(58) Field of Classification Search
CPC .... H01M 4/366; H01M 4/364; H01M 4/1315; H01M 4/505; H01M 4/525; H01M 4/582; H01M 10/0525; H01M 10/052; H01M 2004/028
See application file for complete search history.

(56) References Cited

U.S. PATENT DOCUMENTS

| | | |
|---|---|---|
| 2009/0087362 A1 | 4/2009 | Sun et al. |
| 2011/0183200 A1 | 7/2011 | Odani et al. |
| 2012/0270093 A1 | 10/2012 | Isozaki et al. |

FOREIGN PATENT DOCUMENTS

| | | | |
|---|---|---|---|
| CN | 1658415 | A | 8/2005 |
| CN | 101752558 | A | 6/2010 |
| CN | 102224621 | A | 10/2011 |
| CN | 102511104 | A | 6/2012 |
| CN | 102569722 | A | 7/2012 |
| JP | 2000-340229 | A | 12/2000 |
| JP | 2008-536285 | A | 9/2008 |
| JP | 2011-154963 | A | 8/2011 |
| KR | 2009078128 | * | 7/2009 |
| WO | 2011/108106 | A1 | 9/2011 |
| WO | 2012/086277 | A1 | 6/2012 |
| WO | 2012/101948 | A1 | 8/2012 |
| WO | 2012/176903 | A1 | 12/2012 |

OTHER PUBLICATIONS

Lee et al. "AlF3-coated LiCoO2 and Li[Ni1/3Co1/3Mn1/3]O2 blend composite cathode for lithium ion batteries", Journal of Power Sources 196 (2011), pp. 6974-6977.*
Office Action and Search Report dated Nov. 2, 2016, issued in counterpart Japanese Patent Application No. 201480010833.4. (7 pages).
Ki-Soo Lee et al., "AlF3-coated LiCoO2 and Li[Ni1/3Co1/3Mn1/3]O2 blend composite cathode for lithium ion batteries", Journal of Power Sources, vol. 196, (2011), pp. 6974-6977. Abstract.
Office Action dated Nov. 1, 2016, issued in counterpart Japanese Patent Application No. 2015-502733. (2 pages).
International Search Report dated Apr. 8, 2014, issued in corresponding application No. PCT/JP2014/000328 (1 page).
Translation of the Written Opinion dated Aug. 31, 2015, issued in counterpart International Application No. PCT/JP2014/00328 (4 pages).

* cited by examiner

*Primary Examiner* — Laura Weiner
(74) *Attorney, Agent, or Firm* — Westerman, Hattori, Daniels & Adrian, LLP (57) ABSTRACT

A positive electrode for a nonaqueous electrolyte secondary battery that does not undergo a decrease in discharge capacity in low-temperature discharge during charge and discharge after the battery is left standing at high temperature in a charged state, for example. The positive electrode for a nonaqueous electrolyte secondary battery includes a positive electrode active material. The positive electrode active material includes a mixture of lithium nickel cobalt manganate and lithium cobaltate having a compound adhered to part of a surface thereof, the compound containing fluorine and at least one selected from zirconium, magnesium, titanium, aluminum, and a rare earth element; and a ratio of the lithium nickel cobalt manganate relative to a total amount of the positive electrode active material is 1% by mass or more and less than 70% by mass.

9 Claims, 3 Drawing Sheets

Figure 4

POSITIVE ELECTRODE FOR NONAQUEOUS ELECTROLYTE SECONDARY BATTERY AND NONAQUEOUS ELECTROLYTE SECONDARY BATTERY THAT USES THE POSITIVE ELECTRODE

TECHNICAL FIELD

The present invention relates to a positive electrode for a nonaqueous electrolyte secondary battery and a nonaqueous electrolyte secondary battery that uses the positive electrode.

BACKGROUND ART

Recent years have seen rapid progress in size- and weight-reduction of mobile information terminals such as cellular phones, laptop personal computers, and smart phones and batteries used as the driving power sources for these devices have been required to achieve further higher capacities. A nonaqueous electrolyte secondary battery that is charged and discharged through migration of lithium ions between a positive electrode and a negative electrode has a high energy density and a high capacity; thus, nonaqueous electrolyte secondary batteries are widely used as the driving power sources of such mobile information terminals.

Mobile information terminals tend to consume more power as they are equipped with more and more functions such as a moving picture playing function and a gaming function and thus further higher capacities are desirable. The capacity of a nonaqueous electrolyte secondary battery can be increased by increasing the capacity of an active material, increasing the fill density of the active material used per unit volume, and increasing the charge voltage of the battery. However, increasing the charge voltage of the battery accelerates decomposition of the electrolyte, which is a problem. In particular, when a battery is stored at a high temperature or subjected to a repeated charge-discharge cycle at high temperature, a problem of a decrease in discharge capacity arises.

In view of these, there has been a proposal of using, as a positive electrode active material, a mixture of lithium cobaltate and lithium nickel cobalt manganate, as described below.

PTL 1 proposes a nonaqueous electrolyte secondary battery that includes a positive electrode, a negative electrode, and an electrolyte, in which the positive electrode contains, as a positive electrode active material, at least $Li_xCoO_2$ and $Li_yNi_sCo_tMn_uO_2$ (M represents B, Mg, or the like) and the content of $Li_yNi_sCo_tMn_uO_2$ relative to the total content of $Li_xCoO_2$ and $Li_yNi_sCo_tMn_uO_2$ is 10 to 45% by weight. PTL 1 shows that a nonaqueous secondary battery that has a high capacity, high safety in the event of overcharge, good high-temperature storage properties, and generates little gas under normal operation conditions can be obtained by using this positive electrode.

PTL 2 proposes a positive electrode active material for a lithium secondary battery in which a surface is coated with AlF3, ZnF2, or the like. PTL 2 shows that a phenomenon of degradation of battery performance, such as cycle properties and in particular performance at high voltage and high rate, can be prevented by using this positive electrode active material.

CITATION LIST

Patent Literature

PTL 1: Japanese Published Unexamined Patent Application No. 2000-340229

PTL 2: Japanese Published Unexamined Patent Application (Translation of PCT Application) No. 2008-536285

SUMMARY OF INVENTION

Technical Problem

However, according to the techniques disclosed in PTL 1 and PTL 2, decomposition products occur due to the reaction between the positive electrode and the electrolyte and decomposition and elution of the positive electrode active material occur. In particular, such problems are particularly serious when the battery is exposed to high temperature for a long time in a charged state. Thus, it has not been possible to sufficiently improve the properties of nonaqueous electrolyte secondary batteries.

Thus, an object of an aspect of the present invention is to provide a positive electrode for a nonaqueous electrolyte secondary battery which suppresses a decrease in discharge capacity in low-temperature discharge during charge and discharge after the battery is left in a charged state at high temperature, for example, and to provide a nonaqueous electrolyte secondary battery that uses such a positive electrode.

According to one aspect of the present invention, a positive electrode for a nonaqueous electrolyte secondary battery contains a positive electrode active material, and the positive electrode active material includes a mixture of lithium nickel cobalt manganate and lithium cobaltate having a compound adhered to part of a surface thereof, the compound containing fluorine and at least one selected from zirconium, magnesium, titanium, aluminum, and a rare earth element. A ratio of the lithium nickel cobalt manganate relative to a total amount of the positive electrode active material is 1% by mass or more and less than 70% by mass.

According to another aspect of the present invention, a nonaqueous electrolyte secondary battery includes a positive electrode, a negative electrode, and an electrolyte. A positive electrode active material includes a mixture of lithium nickel cobalt manganate and lithium cobaltate having a compound adhered to part of a surface thereof, the compound containing fluorine and at least one selected from zirconium, magnesium, titanium, aluminum, and a rare earth element; and a ratio of the lithium nickel cobalt manganate relative to a total amount of the positive electrode active material is 1% by mass or more and less than 70% by mass.

Advantageous Effects of Invention

An aspect of the present invention exhibits an advantageous effect of suppressing the decrease in discharge capacity in low-temperature discharge during charge and discharge after the battery in a charged state is exposed to high temperature.

DESCRIPTION OF EMBODIMENTS

An example of an embodiment of the present invention will now be described in detail below. A positive electrode for a nonaqueous electrolyte secondary battery and a battery of the present invention are not limited to those described in the embodiments below and may be subject to change without departing from the scope of the invention.

[Preparation of Positive Electrode]

First, 500 g of lithium cobaltate particles containing 1.5 mol % of Mg and 1.5 mol % of Al dissolved therein relative to lithium cobaltate and 0.05 mol % of Zr were prepared. While the lithium cobaltate particles were being stirred, a solution prepared by dissolving 0.616 g of ammonium fluorozirconate $((NH_4)_2ZrF_6)$ in 50 mL of pure water was sprayed. Then a heat treatment was conducted at 400° C. for 6 hours in air.

The obtained positive electrode active material was observed with a scanning electron microscope (SEM) and it was found that a compound containing fluorine and zirconium and having an average particle size of 100 nm or less was adhered to part of the surface of lithium cobaltate. The amount of adhered zirconium measured by ICP was 0.047% by mass relative to lithium cobaltate on a zirconium element basis. The fluorine content was measured. The F content determined by ion chromatography was 0.058% by mass and the molar ratio of Zr to F was 1:6.

Then lithium cobaltate having a compound containing zirconium and fluorine adhered to part of the surface thereof, and lithium nickel cobalt manganate (nickel, cobalt, and manganese were contained at equal ratios) were mixed at a mass ratio of 80:20 to prepare a positive electrode active material powder composed of two positive electrode active materials. The positive electrode active material powder, a carbon black (acetylene black) powder having an average particle size of 40 nm and serving as a positive electrode conductive agent, and polyvinylidene fluoride (PVdF) serving as a positive electrode binder at a mass ratio of 95:2.5:2.5 were kneaded in an N-methyl-2-pyrrolidone (NMP) solution to prepare a positive electrode mix slurry. Finally, the positive electrode mix slurry was evenly applied to both sides of a positive electrode current collector formed of an aluminum foil, dried, and rolled with a roller. As a result, a positive electrode in which a positive electrode mix layer was formed on each of the two sides of the positive electrode current collector was obtained. The fill density of the active material in the positive electrode was 3.2 g/cm$^3$.

[Preparation of Negative Electrode]

First, artificial graphite serving as a negative electrode active material, sodium carboxymethyl cellulose (CMC), and styrene-butadiene rubber (SBR) serving as a binder were mixed at a mass ratio of 98:1:1 in an aqueous solution to prepare a negative electrode mix slurry. The negative electrode mix slurry was evenly applied to both sides of a negative electrode current collector formed of a copper foil, dried, and rolled with a roller to obtain a negative electrode in which a negative electrode mix layer was formed on each of the two sides of the negative electrode current collector. The fill density of the active material in the negative electrode was 1.65 g/cm$^3$.

[Preparation of Nonaqueous Electrolyte]

Into a mixed solvent containing ethylene carbonate (EC), methyl ethyl carbonate (MEC), and diethyl carbonate (DEC) at a volume ratio of 3:5:2, lithium hexafluorophosphate (LiPF$_6$) was dissolved to a concentration of 1.0 mol/L so as to prepare a nonaqueous electrolyte (nonaqueous electrolyte solution).

[Preparation of Battery]

A lead terminal was attached to each of the positive and negative electrodes. The positive and negative electrodes and a separator placed therebetween were spirally wound around a core and the core was removed to prepare a wound electrode body. The electrode body was flattened to obtain a flat electrode body. Next, the flat electrode body and the nonaqueous electrolyte solution were inserted into an aluminum laminate outer casing to obtain a flat nonaqueous electrolyte secondary battery having a structure shown in FIGS. 1 and 2. The secondary battery was 3.6 mm×35 mm×62 mm in size. The discharge capacity observed by charging the secondary battery to 4.40 V and discharging the secondary battery to 2.75 V was 750 mAh.

Figure 1:
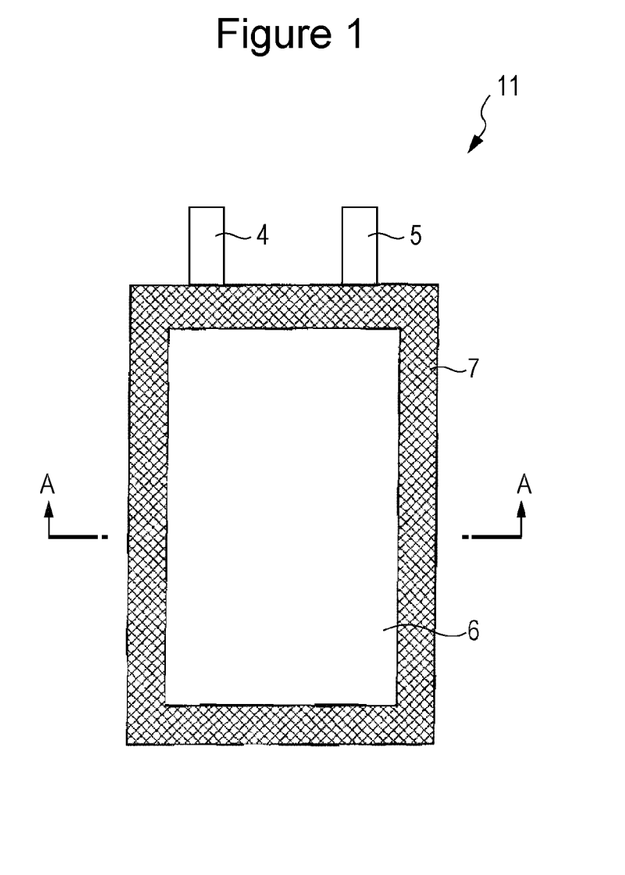
FIG. 1 is a front view of a nonaqueous electrolyte secondary battery which is an example of an embodiment of the present invention.
Figure 2:
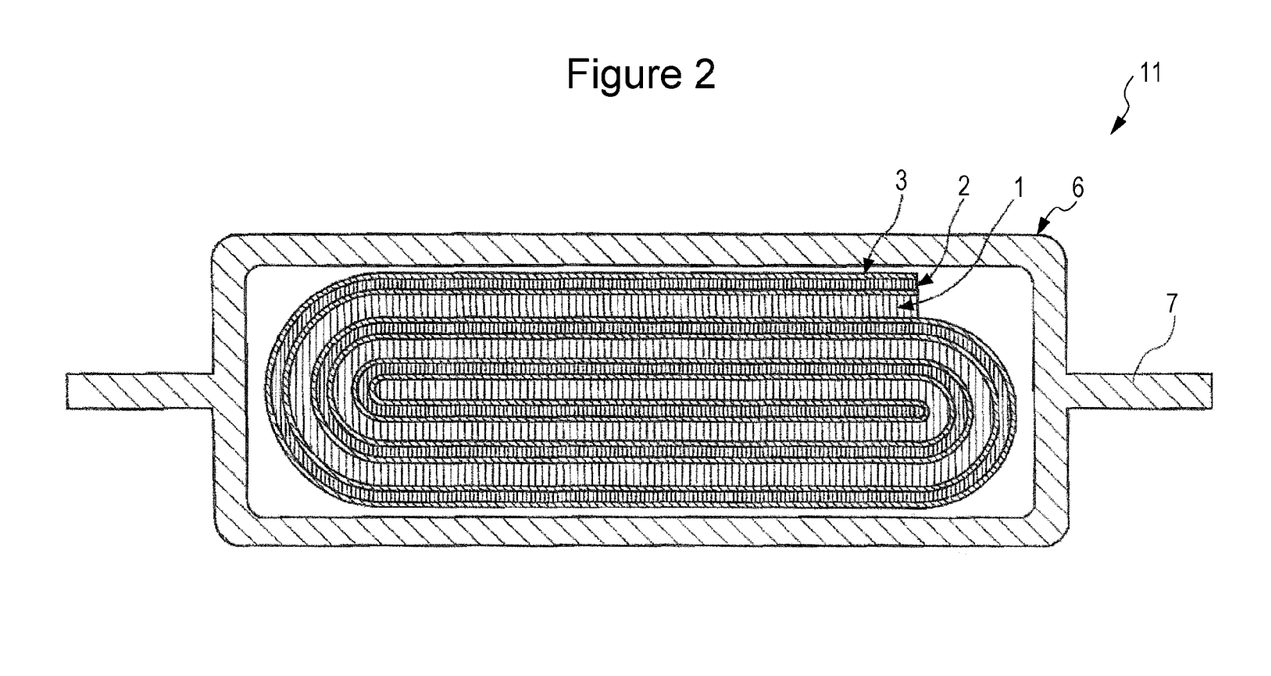
FIG. 2 is a cross-sectional view taken along line A-A in FIG. 1.

As illustrated in FIGS. 1 and 2, a specific structure of a nonaqueous electrolyte secondary battery 11 includes a positive electrode 1 and a negative electrode 2 arranged to oppose each other with a separator 3 therebetween. A flat electrode body constituted by the positive and negative electrodes 1 and 2 and the separator 3 is impregnated with a nonaqueous electrolyte solution. The positive electrode 1 and the negative electrode 2 are respectively connected to a positive electrode current collecting tab 4 and a negative electrode current collecting tab 5 so that the secondary battery can be charged and discharged. The electrode body is placed in a housing space of an aluminum laminate outer casing 6 that has a sealing part 7 in which rims are heat-sealed with each other.

EXAMPLES

Experimental Example 1

A battery was prepared by the same method as that described in Description of Embodiments.

The battery prepared as such is referred to as a battery A1 hereinafter.

Experimental Example 2

A battery was prepared as in Experimental Example 1 except that the positive electrode active material was a 90:10 (mass basis) mixture of lithium cobaltate having a compound containing zirconium and fluorine adhered to part of the surface thereof (hereinafter this lithium cobaltate may be referred to as surface-modified lithium cobaltate) and lithium nickel cobalt manganate.

The battery prepared as such is hereinafter referred to as a battery A2.

Experimental Example 3

A battery was prepared as in Experimental Example 1 except that the positive electrode active material was a 70:30 (mass basis) mixture of the surface-modified lithium cobaltate and lithium nickel cobalt manganate.

The battery prepared as such is hereinafter referred to as a battery A3.

Experimental Example 4

A battery was prepared as in Experimental Example 1 except that the positive electrode active material was a 60:40

(mass basis) mixture of the surface-modified lithium cobaltate and lithium nickel cobalt manganate.

The battery prepared as such is hereinafter referred to as a battery A4.

Experimental Example 5

A battery was prepared as in Experimental Example 1 except that the positive electrode active material was a 95:5 (mass basis) mixture of the surface-modified lithium cobaltate and lithium nickel cobalt manganate.

The battery prepared as such is hereinafter referred to as a battery A5.

Experimental Example 6

A battery was prepared as in Experimental Example 1 except that only the surface-modified lithium cobaltate was used as the positive electrode active material.

The battery prepared as such is hereinafter referred to as a battery A6.

Experimental Example 7

A battery was prepared as in Experimental Example 1 except that the positive electrode active material was a 30:70 (mass basis) mixture of the surface-modified lithium cobaltate and lithium nickel cobalt manganate.

The battery prepared as such is hereinafter referred to as a battery A7.

Experimental Example 8

A battery was prepared as in Experimental Example 1 except that only lithium cobaltate not having a compound containing zirconium and fluorine adhered thereto (this cobaltate may be referred to as surface-unmodified lithium cobaltate hereinafter) was used as the positive electrode active material.

The battery prepared as such is hereinafter referred to as a battery B1.

Experimental Example 9

A battery was prepared as in Experimental Example 1 except that the positive electrode active material was a 80:20 (mass basis) mixture of the surface-unmodified lithium cobaltate and lithium nickel cobalt manganate.

The battery prepared as such is hereinafter referred to as a battery B2.

Experimental Example 10

A battery was prepared as in Experimental Example 1 except that the positive electrode active material was a 90:10 (mass basis) mixture of the surface-unmodified lithium cobaltate and lithium nickel cobalt manganate.

The battery prepared as such is hereinafter referred to as a battery B3.

Experimental Example 11

A battery was prepared as in Experimental Example 1 except that the positive electrode active material was a 70:30 (mass basis) mixture of the surface-unmodified lithium cobaltate and lithium nickel cobalt manganate.

The battery prepared as such is hereinafter referred to as a battery B4.

Experimental Example 12

A battery was prepared as in Experimental Example 1 except that the positive electrode active material was a 60:40 (mass basis) mixture of the surface-unmodified lithium cobaltate and lithium nickel cobalt manganate.

The battery prepared as such is hereinafter referred to as a battery B5.

Experimental Example 13

A battery was prepared as in Experimental Example 1 except that the positive electrode active material was a 95:5 (mass basis) mixture of the surface-unmodified lithium cobaltate and lithium nickel cobalt manganate.

The battery prepared as such is hereinafter referred to as a battery B6.

Experimental Example 14

A battery was prepared as in Experimental Example 1 except that only lithium nickel cobalt manganate was used as the positive electrode active material.

The battery prepared as such is hereinafter referred to as a battery B7.

Experimental Example 15

Surface-modified lithium cobaltate having a zirconium oxide adhered to the surface and serving as a positive electrode active material was obtained (a heat treatment at 400° C. was also performed) as in Experimental Example 1 except that, during the surface modification, ammonium zirconium carbonate $((NH_4)_2ZrO(CO_3)_2)$ was used instead of $(NH_4)_2ZrF_6$. A battery was prepared as in Experimental Example 1 except that a 80:20 mixture of this lithium cobaltate and lithium nickel cobalt manganate was used.

The battery prepared as such is hereinafter referred to as a battery C1.

Experimental Example 16

Surface-modified lithium cobaltate having a zirconium oxide adhered to the surface and serving as a positive electrode active material was obtained (a heat treatment at 400° C. was also performed) as in Experimental Example 1 except that, during the surface modification, ammonium zirconium carbonate $((NH_4)_2ZrO(CO_3)_2)$ was used instead of $(NH_4)_2ZrF_6$. This active material was mixed with a lithium fluoride powder to obtain lithium cobaltate to which zirconium oxide and lithium fluoride were separately adhered. The zirconium-to-fluorine molar ratio was 1:6. A battery was prepared as in Experimental Example 1 except that a 80:20 mixture of this lithium cobaltate and lithium nickel cobalt manganate was used.

The battery prepared as such is hereinafter referred to as a battery D1.

Experimental Example 17

A battery was prepared as in Experimental Example 1 except that lithium nickel cobalt manganate having a compound containing zirconium and fluorine adhered to part of the surface (hereinafter this manganate may be referred to as surface-modified lithium nickel cobalt manganate) was used as the positive electrode active material instead of lithium nickel cobalt manganate not having a compound containing zirconium and fluorine adhered to part of the surface (hereinafter this manganate may be referred to as surface-unmodified lithium nickel cobalt manganate). The surface-modified lithium nickel cobalt manganate was prepared by the same method for preparing the surface-modified lithium cobaltate. The positive electrode active material obtained was observed with a scanning electron microscope (SEM) and it was found that a compound containing zirconium and fluorine and having an average particle size of 100 nm or less was adhered to part of the surface of lithium nickel cobalt manganate. The amount of zirconium adhered measured by ICP was 0.047% by mass relative to lithium nickel cobalt manganate on a zirconium element basis. The fluorine content measured by ion chromatography was 0.058% by mass and the Zr-to-F molar ratio was 1:6.

The battery prepared as such is hereinafter referred to as a battery E1.

Experimental Example 18

Prepared was 500 g of lithium cobaltate particles in which 1.5 mol % of Mg and 1.5 mol % of Al were dissolved relative to lithium cobaltate. The lithium cobaltate particles were added to 1.5 L of pure water. While the particles were being stirred, an aqueous solution obtained by dissolving 1.13 g of erbium nitrate pentahydrate ($Er(NO_3)_3.5H_2O$) in 100 mL of pure water was added to the particles. During this process, 10% by mass of an aqueous sodium hydroxide solution was added to adjust the pH of the solution to 9 and cause erbium hydroxide to attach to the surfaces of the lithium cobaltate particles. The resulting product was subjected to suction filtration and the treated product was filtered out and dried at 120° C. As a result, lithium cobaltate particles with erbium hydroxide dispersed over and adhered to the surfaces were obtained.

Next, while the positive electrode active material obtained was being stirred, an aqueous solution obtained by dissolving 0.28 g of ammonium fluoride ($NH_4F$) in 25 g of pure water was sprayed. Then a heat treatment was conducted at 400° C. for 6 hours in air.

The obtained positive electrode active material was observed with a scanning electron microscope (SEM) and it was found that a compound having an average particle size of 100 nm or less and containing erbium and fluorine was adhered to part of the surface of lithium cobaltate. The amount of erbium adhered measured by ICP was 0.085% by mass relative to lithium cobaltate. The fluorine content determined by ion chromatography was 0.029% by mass relative to lithium cobaltate and the erbium-to-F molar ratio was 1:3.

Then a battery was prepared as in Experimental Example 1 except that a positive electrode active material powder composed of two positive electrode active materials was prepared by mixing lithium cobaltate having a compound containing erbium and fluorine adhered to part of the surface and lithium nickel cobalt manganate (nickel, cobalt, and manganese were contained at equal ratios) at a mass ratio of 70:30.

The battery prepared as such is hereinafter referred to as a battery F1.

Experimental Example 19

A battery was prepared as in Experimental Example 18 except that 1.14 g of samarium nitrate hexahydrate ($Sm(NO_3)_3.6H_2O$) was used instead of erbium nitrate pentahydrate.

The amounts of samarium adhered and fluorine adhered were, respectively, 0.077% by mass and 0.029% by mass and the samarium-to-fluorine molar ratio was 1:3.

The battery prepared as such is hereinafter referred to as a battery G1.

Experimental Example 20

A battery was prepared as in Experimental Example 18 except that 1.12 g of neodymium nitrate hexahydrate ($Nd(NO_3)_3.6H_2O$) was used instead of erbium nitrate pentahydrate.

The amounts of neodymium adhered and fluorine adhered were, respectively, 0.074% by mass and 0.029% by mass and the neodymium-to-fluorine molar ratio was 1:3.

The battery prepared as such is hereinafter referred to as a battery H1.

Experimental Example 21

A battery was prepared as in Experimental Example 18 except that 1.11 g of lanthanum nitrate hexahydrate ($La(NO_3)_3.6H_2O$) was used instead of erbium nitrate pentahydrate.

The amounts of lanthanum adhered and fluorine adhered were, respectively, 0.071% by mass and 0.029% by mass and the lanthanum-to-fluorine molar ratio was 1:3.

The battery prepared as such is hereinafter referred to as a battery I1.

Experimental Example 22

A battery was prepared as in Experimental Example 18 except that 0.65 g of magnesium nitrate hexahydrate ($Mg(NO_3)_2.6H_2O$) was used instead of erbium nitrate pentahydrate and that an aqueous solution of 0.19 g of ammonium fluoride in 25 g of pure water was used instead of the aqueous solution of 0.28 g of ammonium fluoride in 25 g of pure water.

The amounts of magnesium adhered and fluorine adhered were, respectively, 0.012% by mass and 0.019% by mass and the magnesium-to-fluorine molar ratio was 1:2.

The battery prepared as such is hereinafter referred to as a battery J1.

Experimental Example 23

A battery was prepared as in Experimental Example 18 except that 0.96 g of aluminum nitrate nonahydrate ($Al(NO_3)_3.9H_2O$) was used instead of erbium nitrate pentahydrate.

The amounts of aluminum adhered and fluorine adhered were, respectively, 0.014% by mass and 0.029% by mass and the aluminum-to-fluorine molar ratio was 1:3.

The battery prepared as such is hereinafter referred to as a battery K1.

Experimental Example 24

A battery was prepared as in Experimental Example 18 except that lithium nickel cobalt manganate having a compound containing erbium and fluorine adhered to part of the surface was used as the positive electrode active material instead of lithium nickel cobalt manganate not having an compound containing erbium and fluorine adhered to part of the surface. The lithium nickel cobalt manganate having a compound containing erbium and fluorine adhered to part of the surface was prepared by the same method as that for preparing lithium cobaltate having a compound containing erbium and fluorine adhered to part of the surface. The obtained positive electrode active material was observed with a scanning electron microscope (SEM) and it was found that a compound having an average particle size of 100 nm or less and containing erbium and fluorine was adhered to part of the surface of lithium nickel cobalt manganate. The amount of adhered zirconium measured by ICP was 0.085% by mass relative to lithium nickel cobalt manganate on an erbium element basis. The fluorine content determined by ion chromatography was 0.029% by mass and the Er-to-F molar ratio was 1:3.

The battery prepared as such is hereinafter referred to as a battery L1.

Experiment 1

The batteries A1 to A7, B1 to B7, and C1 to L1 were charged and discharged under the following conditions and the capacity retention in low-temperature discharge after the batteries were charged and stored at 60° C. was investigated. The results are indicated in Table 1.

[Charge and Discharge Conditions of the First Cycle]

Charging Conditions of the First Cycle

Constant-current charging was performed at a current of 1.0 It (750 mA) until the battery voltage was 4.40 V and then constant-voltage charging was performed at a voltage of 4.40 V until the current value was 37.5 mA.

Discharging Conditions of the First Cycle

Constant-current discharging was performed at a current of 1.0 It (750 mA) until the battery voltage was 2.75 V.

Interval

The interval between charging and discharging was 10 minutes.

[Conditions of Charging and Storage at 60° C.]

A battery was charged under the same conditions as those for the first cycle and left standing in a 60° C. thermostat oven for 70 hours. The battery was then cooled to room temperature and discharged under the same conditions as those for the first cycle at room temperature.

[Measurement of Discharge Capacity at 25° C.]

A charge/discharge cycle test was performed once under the above-described conditions at 25° C. and the discharge capacity Q1 (discharge capacity Q1 at 25° C.) was measured.

[Measurement of Discharge Capacity at −20° C.]

A battery was charged under the same conditions as those for the first cycle at 25° C. and left standing in a −20° C. thermostat oven for 4 hours. In the same −20° C. environment, constant-current charging was conducted at a current of 1.0 It (750 mA) until the battery voltage was 2.75 V. The discharge capacity Q2 (discharge capacity Q2 at −20° C.) was measured.

The capacity retention in low-temperature discharge was determined by using equation (1) below:

Capacity retention (%) at low-temperature discharge=(discharge capacity $Q2$ at −20° C./discharge capacity $Q1$ at 25° C.)×100(%)

TABLE 1

| Battery type | Positive electrode active material:lithium cobaltate | | Positive electrode active material:lithium nickel cobalt manganate | | Capacity retention in low-temperature discharge after storage (%) |
|---|---|---|---|---|---|
| | Adhered element | Mixing ratio (mass %) | Adhered element | Mixing ratio (mass %) | |
| Battery A1 | Zr—F | 80 | None | 20 | 67.2 |
| Battery A2 | Zr—F | 90 | None | 10 | 69.0 |
| Battery A3 | Zr—F | 70 | None | 30 | 65.7 |
| Battery A4 | Zr—F | 60 | None | 40 | 62.2 |
| Battery A5 | Zr—F | 95 | None | 5 | 64.3 |
| Battery A6 | Zr—F | 100 | None | 0 | 58.4 |
| Battery A7 | Zr—F | 30 | None | 70 | 22.3 |
| Battery B1 | None | 100 | None | 0 | 0.8 |
| Battery B2 | None | 80 | None | 20 | 9.8 |
| Battery B3 | None | 90 | None | 10 | 7.4 |
| Battery B4 | None | 70 | None | 30 | 15.1 |
| Battery B5 | None | 60 | None | 40 | 14.9 |
| Battery B6 | None | 95 | None | 5 | 6.5 |
| Battery B7 | None | 0 | None | 100 | 30.6 |
| Battery C1 | Zr—O | 80 | None | 20 | 40.2 |
| Battery D1 | Zr—O, LiF | 80 | None | 20 | 40.3 |
| Battery E1 | Zr—F | 80 | Zr—F | 20 | 68.3 |
| Battery F1 | Er—F | 70 | None | 30 | 82.7 |
| Battery G1 | Sm—F | 70 | None | 30 | 76.6 |
| Battery H1 | Nd—F | 70 | None | 30 | 75.9 |
| Battery I1 | La—F | 70 | None | 30 | 71.0 |
| Battery J1 | Mg—F | 70 | None | 30 | 61.2 |
| Battery K1 | Al—F | 70 | None | 30 | 57.1 |
| Battery L1 | Er—F | 70 | Er—F | 30 | 85.1 |

(Observations on Batteries A1 to A7, B1 to B7, and C1 to E1)

Table 1 clearly indicates that the capacity retention in low-temperature discharge is higher in batteries A1 to A5 in which lithium cobaltate surface-modified with a compound containing zirconium and fluorine, and lithium nickel cobalt manganate were mixed at a mixing ratio of 95:5 to 60:40 (in other words, the positive electrode active material of battery A6 and the positive electrode active material of battery B7 were mixed) than in battery A6 in which the only positive electrode active material used was lithium cobaltate surface-modified with a compound containing zirconium and fluorine, battery B7 in which lithium nickel cobalt manganate alone was used as the positive electrode active material, or battery A7 in which lithium cobaltate surface-modified with a compound containing zirconium and fluorine, and lithium nickel cobalt manganate were mixed at a mixing ratio of 30:70. In other words, the results indicate that the properties of batteries A1 to A5 are not within the range of the properties of batteries A6 and B7 but beyond these ranges (For example, the retention of batteries A1 to A6 in which the positive electrode active material of battery A6 and the positive electrode active material of battery B7 are mixed is expected to be in the range of 30.6 to 58.4% since the retention of battery A6 is 58.4% and that of battery B7 is 30.6%; however, actually, the retention is 62.2% or more and beyond the expected range). This is presumably due to a synergetic effect of mixing two positive electrode active materials at a particular ratio. The results indicate that the mixing ratio of lithium cobaltate surface-modified with a compound containing zirconium and fluorine to lithium nickel cobalt manganate is preferably 95:5 to 60:40.

The capacity retention in low-temperature discharge is higher in batteries B2 to B6 in which a mixture of lithium cobaltate not having a compound containing zirconium and fluorine adhered to part of the surface (hereinafter this cobaltate may be referred to as surface-unmodified lithium cobaltate) and lithium nickel cobalt manganate (in other words, a mixture of the positive electrode active material of battery B1 and the positive electrode active material of battery B7) was used as the positive electrode active material, than in battery B1 in which surface-unmodified lithium cobaltate alone was used as the positive electrode active material. However, the capacity retention in low-temperature discharge in batteries B2 to B6 is lower than that in battery B7 in which lithium nickel cobalt manganate alone was used as the positive electrode active material. In other words, the properties of batteries B2 to B6 are within the ranges of battery B1 and battery B7. Accordingly, unlike the case of batteries A1 to A5, a synergetic effect of mixing two positive electrode active materials is not exhibited in batteries B2 to B7.

The causes that led to the experimental results described above are probably as follows. That is, in batteries A1 to A5, presence of a compound containing zirconium and fluorine decreases the catalytic property of cobalt in lithium cobaltate and this affects lithium nickel cobalt manganate as well. Thus, an effect of suppressing elution of nickel, cobalt, and manganese is exhibited. Moreover, suppressing the activation of lithium nickel cobalt manganate leads to further suppression of activation of lithium cobaltate and further suppression of decomposition of the electrolyte. Presumably due to this synergetic effect, formation of an inactive layer on the surface of the positive electrode active material can be suppressed and thus the discharge performance is improved drastically. In contrast, batteries B2 to B6 do not contain a compound containing zirconium and fluorine and thus this synergetic effect cannot be exhibited and the capacity retention in low-temperature discharge is not improved. Since only lithium cobaltate is used in battery A6, the synergetic effect is not obtained. In battery A7, lithium nickel cobalt manganate is in excess relative to lithium cobaltate and thus the compound containing zirconium and fluorine does not have a sufficient effect of suppressing activation of lithium cobaltate. In battery C1, zirconium is the only adhered element and no fluorine is contained; thus, a sufficient effect of suppressing activation of lithium cobaltate is not obtained. In battery D1, lithium cobaltate has a zirconium oxide which is a zirconium compound and lithium fluoride which is a fluorine compound separately adhered; and the synergetic effect is not obtained. This result shows that the effect is not obtained unless the compound adhered to the surface is a compound in which at least zirconium and fluorine are bonded to each other.

Batteries A1 to A5 are compared. It is found that batteries A1 to A3 and A5 show significant improvement compared to battery A4. Accordingly, the mixing mass ratio of lithium cobaltate surface-modified with a compound containing zirconium and fluorine to lithium nickel cobalt manganate is particularly preferably 95:5 to 70:30. The mixing mass ratio of lithium cobaltate surface-modified with a compound containing zirconium and fluorine to lithium nickel cobalt manganate is particularly preferably 90:10 to 70:30.

As discussed above, decomposition of the electrolyte and elution of metals in the positive electrode active material can be effectively suppressed by using a positive electrode active material which is a mixture prepared by mixing lithium cobaltate having a compound containing zirconium and fluorine adhered to part of the surface and lithium nickel cobalt manganate at a particular ratio. Accordingly, a battery that has high capacity retention in low-temperature discharge even after the battery is left in a charged state at high temperature can be obtained.

Figure 3:
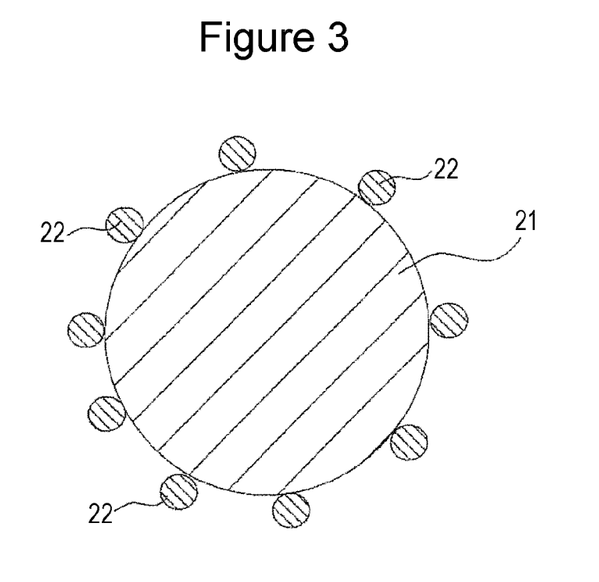
FIG. 3 is a diagram illustrating a surface state of lithium cobaltate according to an example of an embodiment of the present invention.
Figure 4:
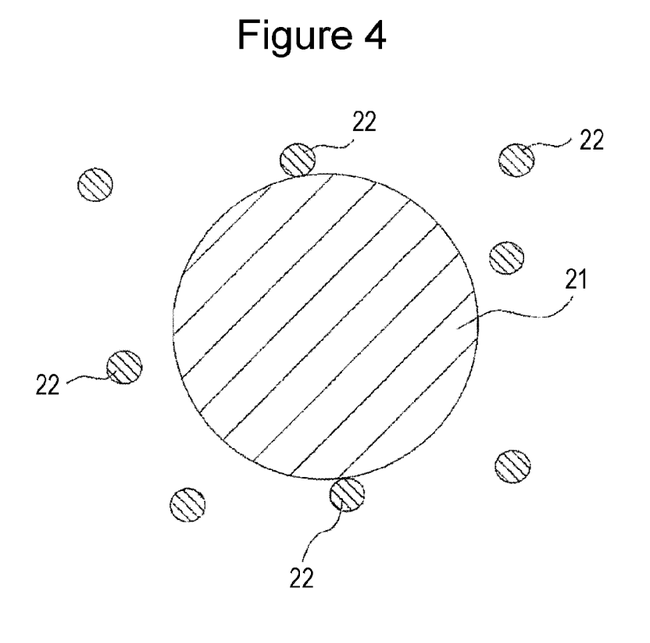
FIG. 4 is a diagram illustrating a surface state different from the surface state of lithium cobaltate according to the example of the embodiment of the present invention.

The state in which a compound containing zirconium and fluorine is adhered to part of the surface of lithium cobaltate refers to a state shown in FIG. 3 in which most of zirconium-and-fluorine-containing compound particles 22 are adhered to a surface of a lithium cobaltate particle 21. In other words, this state does not include a state in which some of zirconium-and-fluorine-containing compound particles 22 are accidentally in contact with a lithium cobaltate particle 21 as a result of merely mixing the lithium cobaltate particle 21 and the zirconium-and-fluorine-containing compound particles 22, as shown in FIG. 4. The zirconium-and-fluorine-containing compound is preferably a compound that contains $ZrF_4$ or $Li_2ZrF_6$ as a main component. Some of the fluorine atoms may be substituted with oxygen but the F-to-O ratio (F/O) is preferably 2 or more in terms of molar ratio. When these compounds are used, the effect of suppressing activity at the lithium cobaltate surface is high, and the synergetic effect brought by being combined with lithium nickel cobalt manganate is further enhanced.

The content of lithium nickel cobalt manganate relative to the total amount of the positive electrode active material is limited to 1% by mass or more and less than 70% by mass for the following reasons.

If the lithium nickel cobalt manganate content relative to the total amount of the positive electrode active material is less than 1% by mass, the content of lithium cobaltate is excessively large and thus the amount of the decomposed electrolyte may increase and the discharge voltage may decrease despite attachment of the compound containing zirconium and fluorine onto part of the surface. In contrast, if the lithium nickel cobalt manganate content is 70% by mass or more relative to the total amount of the positive electrode active material, the lithium nickel cobalt manganate content is excessively high and activation of the lithium nickel cobalt manganate may not be sufficiently suppressed.

When these points are considered, the lithium nickel cobalt manganate content relative to the total amount of the positive electrode active material is preferably 3% by mass or more and 50% by mass or less and more preferably 5% by mass or more and 30% by mass or less.

Comparison of battery E1 and battery A1 shows that the capacity retention in low-temperature discharge is further enhanced if a compound containing zirconium and fluorine is adhered to not only part of the surface of lithium cobaltate but also part of the surface of the lithium nickel cobalt manganate. Accordingly, causing a compound containing zirconium and fluorine to attach to part of the surface of lithium nickel cobalt manganate as well as part of the surface of lithium cobaltate can further improve the capacity retention in low-temperature discharge.

This is probably due to the following reason: lithium nickel cobalt manganate also contains cobalt, nickel, and the like and may cause decomposition of the electrolyte; however, by causing a compound containing zirconium and fluorine to attach to part of the surface of lithium nickel cobalt manganate, an effect of suppressing the decomposition reaction of the electrolyte at the surface of the lithium nickel cobalt manganate can be exhibited. However, this effect is presumably mainly attributable to a compound having zirconium and fluorine adhered to part of the surface of lithium cobaltate.

As such, according to one aspect of the present invention, a compound containing zirconium and fluorine may be caused to attach to part of the surface of lithium cobaltate as well as part of the surface of lithium nickel cobalt manganate.

The compound containing zirconium and fluorine preferably has an average particle size of 100 nm or less.

If the average particle size exceeds 100 nm, attaching the same mass of the compound containing zirconium and fluorine causes uneven distribution as to where the particles are adhered and the above-described effect may not be fully exhibited.

The lower limit of the average particle size of the compound containing zirconium and fluorine is preferably 0.1 nm or more and more preferably 1 nm or more. If the average particle size of the compound containing zirconium and fluorine is less than 0.1 nm, the compound containing zirconium and fluorine is excessively small in size and the surface of the positive electrode active material would be excessively coated with the particles.

(Observations on Batteries F1 to L1)

The capacity retention in low-temperature discharge was higher in batteries F1 to I1 in which lithium cobaltate surface-modified with a compound containing erbium and fluorine, samarium and fluorine, neodymium and fluorine, or lanthanum and fluorine was used, battery J1 in which lithium cobaltate surface-modified with a compound containing magnesium and fluorine was used, and battery K1 in which lithium cobaltate surface-modified with a compound containing magnesium and fluorine was used, than in batteries B1 to B7.

It can be presumed that a synergetic effect was also achieved in batteries F1 to I1, J1, and K1 since surface-modified lithium cobaltate and lithium nickel cobalt manganate were mixed at a particular ratio as in batteries A1 to A5 in which lithium cobaltate surface-modified with a compound containing zirconium and fluorine is used.

In particular, batteries F1 to I1 in which lithium cobaltate surface-modified with a compound containing a rare earth element is used have higher capacity retention in low-temperature discharge than batteries A1 to A5 in which lithium cobaltate surface-modified with a compound containing zirconium and fluorine is used.

In the case where lithium cobaltate is surface-modified with a compound that contains a rare earth element and fluorine, a higher effect of suppressing the catalytic effect of cobalt is exhibited compared to the case where a compound that contains zirconium and fluorine is used for surface modification. As a result, a higher effect of suppressing elution of cobalt, manganese, and nickel and decomposition of the electrolyte is achieved. Consequently, formation of an inactive layer on the surface of the positive electrode active material can be suppressed and the discharge performance can be improved. This effect is particularly notable when erbium is used as the rare earth element.

Battery F1 and battery L1 are compared. The capacity retention in low-temperature discharge is further enhanced when a compound containing erbium and fluorine is adhered to part of the surface of lithium nickel cobalt manganate as well as part of the surface of lithium cobaltate. Thus, the capacity retention in low-temperature discharge can be further improved by causing a compound containing erbium and fluorine to attach to part of the surface of lithium nickel cobalt manganate as well as part of the surface of lithium cobaltate.

This is probably due to the following reason: Since lithium nickel cobalt manganate contains cobalt, nickel, and the like, decomposition of the electrolyte may occur; however, causing a compound containing fluorine and erbium to attach to part of the surface of lithium nickel cobalt manganate may bring an effect of suppressing decomposition reaction of the electrolyte at the surface of the lithium nickel cobalt manganate. However, this effect is presumably mainly attributable to the compound containing erbium and fluorine adhered to part of the surface of lithium cobaltate.

In the embodiments of the present invention, a compound that contains fluorine and at least one selected from zirconium, erbium, samarium, neodymium, lanthanum, magnesium, and aluminum has been used as an example. However, the compound is not limited to this and any fluorine-containing compound can achieve the effect of the present invention. Examples of the compound other than those described in the embodiments above include a compound containing fluorine and at least one selected from titanium and rare earth elements. This is due to the following reason.

Oxidation decomposition reaction of the electrolyte occurs at the surface of the positive electrode active material due to a high catalytic effect of lithium cobaltate. The decomposition products of the oxidation decomposition reaction not only undergo repeated re-decomposition reaction and reaction with the electrolyte and migrate to the negative electrode but also attach to the surface of the positive electrode and form a layer with low lithium ion conductivity at the surface of the positive electrode. When such fluorine-containing compounds attach to the surface of lithium cobaltate, not only the catalytic effect of lithium cobaltate is degraded but also the compound containing fluorine adsorbs decomposition product radicals; thus, formation of a layer having low lithium ion conductivity on the surface of lithium cobaltate is prevented. However, a sufficient suppressing effect is not obtained from fluorine compounds other than those described above. An example thereof is lithium fluoride.

At least one rare earth element selected from scandium, yttrium, lanthanum, cerium, praseodymium, neodymium, samarium, europium, gadolinium, terbium, dysprosium, holmium, erbium, thulium, ytterbium, and lutetium can be used as the rare earth element. In particular, neodymium, samarium, erbium, or lanthanum is preferably used.

The mixing mass ratio of lithium cobaltate having a compound containing fluorine and at least one selected from magnesium, titanium, aluminum, and rare earth elements adhered to the surface thereof relative to lithium nickel cobalt manganate is preferably 95:5 to 60:40 as with the case of a battery that uses lithium cobaltate surface-modified with a compound containing zirconium and fluorine. More preferably, the mixing ratio is 90:10 to 70:30. Presumably, as long as the ratio is within the described range, a synergetic effect of mixing the two positive electrode active materials can be achieved.

A compound mainly containing $MgF_2$, $LiMgF_3$, $NaMgF_3$, $KMgF_3$, or the like is preferably used as a compound containing magnesium and fluorine, for example. A compound mainly containing $AlF_3$, $LiAlF_4$, $NaAlF_4$, $KAlF_4$, or the like is preferably used as the compound containing aluminum and fluorine, for example. A compound mainly containing $TiF_4$, $LiTiF_5$, $NaTiF_5$, $KTiF_5$, or the like is preferably used as the compound containing titanium and fluorine, for example. A compound mainly containing $ErF_3$, $LiErF_4$, $NaErF_4$, $KErF_4$, $SmF_3$, $LiSmF_4$, $NaSmF_4$, $KSmF_4$, $SmF_3$, $LiSmF_4$, $NaSmF_4$, $KSmF_4$, $NdF_3$, $LiNdF_4$, $NaNdF_4$, $KNdF_4$, $LaF_3$, $LiLaF_4$, $NaLaF_4$, $KLaF_4$, or the like is preferably used as the compound containing a rare earth element and fluorine, for example. While some of fluorine atoms may be substituted with oxygen, the F-to-O ratio (F/O) is preferably 2 or more in terms of molar ratio. When these compounds are used, the effect of suppressing the activity at the lithium cobaltate surface is high and the effect of combining lithium cobaltate and lithium nickel cobalt manganate is further enhanced.

The ratio of lithium nickel cobalt manganate relative to the total amount of the positive electrode active material is preferably 1% by mass or more and less than 70% by mass, more preferably 3% by mass or more and 50% by mass or less, and most preferably 5% by mass or more and 30% by mass or less as in the case of the battery that uses lithium cobaltate surface-modified with a compound containing zirconium and fluorine.

Causing the compound containing fluorine and at least one selected from magnesium, titanium, aluminum, and a rare earth element to attach to part of the surface of lithium nickel cobalt manganate as well as part of the surface of the lithium cobaltate presumably further improves the capacity retention in low-temperature discharge as with the case of the battery that uses lithium cobaltate surface-modified with a compound containing zirconium and fluorine.

A compound containing fluorine and at least one selected from magnesium, titanium, aluminum, and a rare earth element preferably has an average particle diameter of 100 nm or less as with the compound containing zirconium and fluorine. The lower limit of the average particle diameter is preferably 0.1 nm or more and more preferably 1 nm or more.

According to an aspect of the present invention, the positive electrode of a nonaqueous electrolyte secondary battery described above, a negative electrode, and an electrolyte are included.

Other aspects of the present inventions provide the following features.
(Other Features)
(1) Examples of the method for causing a compound containing zirconium and fluorine to attach to part of the surface of lithium cobaltate and/or lithium nickel cobalt manganate include a method that involves spraying a solution containing a compound containing zirconium and fluorine while a positive electrode active material powder is being mixed, for example, and a method that involves synthesizing a compound containing zirconium and fluorine and mixing the compound with an active material, or performing a heat-treatment at 500° C. or less after mixing. An example of the method for causing a compound containing fluorine and any one of a rare earth element, magnesium, titanium, and aluminum to attach to part of the surface of lithium cobaltate and/or lithium nickel cobalt manganate is a method that involves causing a compound containing a rare earth element, magnesium, titanium, or aluminum to attach to a positive electrode active material and then spraying an aqueous solution containing fluorine. $NH_4F$, $NaF$, $KF$, or the like is suitable for use as the solute of the aqueous solution containing fluorine, for example.

(2) Lithium cobaltate may have a substance such as Al, Mg, Ti, or Zr dissolved therein or present at grain boundaries. A compound containing Al, Mg, Ti, a rare earth element, or the like may be adhered to the surface of lithium cobaltate as well as well as a rare earth compound. This is because contact between the electrolyte and the positive electrode active material can still be suppressed even when these compounds are adhered.

(3) Lithium nickel cobalt manganate described above may be one having a known composition such as one having a nickel-to-cobalt-to-manganese molar ratio of 1:1:1 or 5:3:2, for example. In particular, a composition in which the ratios of nickel and cobalt are larger than that of manganese is preferably used in order to increase the positive electrode capacity.

(4) The solvent of the nonaqueous electrolyte used in the present invention is not limited and a solvent which has been used in nonaqueous electrolyte secondary batteries can be used. Examples thereof include cyclic carbonates such as ethylene carbonate, propylene carbonate, butylene carbonate, and vinylene carbonate, linear carbonates such as dimethyl carbonate, methyl ethyl carbonate, and diethyl carbonate, ester-containing compounds such as methyl acetate, ethyl acetate, propyl acetate, methyl propionate, ethyl propionate, and γ-butyrolactone, sulfone-group-containing compounds such as propane sultone, ether-containing compounds such as 1,2-dimethoxyethane, 1,2-diethoxydthane, tetrahydrofuran, 1,2-dioxane, 1,4-dioxane, and 2-methyltetrahydrofuran, nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetri carbonitrile, and amide-containing compounds such as dimethylformamide. In particular, solvents in which some of H in these are substituted with F are preferred for use. These solvents can be used alone or in combination. A solvent in which a cyclic carbonate and a linear carbonate are combined and a solvent in which a small amount of a nitrile-containing compound or ether-containing compound is combined with the cyclic and linear carbonates are preferable.

Meanwhile, any conventional solute can be used as the solute of the nonaqueous electrolyte. Examples of the solute include $LiPF_6$, $LiBF_4$, $LiN(SO_2CF_3)_2$, $LiN(SO_2C_2F_5)_2$, and $LiPF_{6-x}(C_nF_{2n-1})_x$ [where $1<x<6$ and $n=1$ or 2] and these solutes can be used alone or in combination. The solute concentration is not particularly limited but is preferably 0.8 to 1.5 mol per liter of the electrolyte solution.

(5) The negative electrode used in the present invention may be a conventional negative electrode and examples thereof include carbon materials that can intercalate/deintercalate lithium, metals that can alloy with lithium, or alloy compounds that contain such metals. Examples of the carbon materials include graphite such as natural graphite, non-graphitizable carbon, and artificial graphite, and cokes. An example of the alloy compound is a compound that contains at least one metal that can alloy with lithium. In particular, the element that can alloy with lithium is preferably silicon or tin or an oxide thereof such as silicon oxide or tin oxide. A mixture of a carbon material and a compound of silicon or tin can also be used.

In addition to the above-described materials, a compound, such as lithium titanate, having a higher charge/discharge potential relative to metallic lithium than carbon materials and the like can be used although the energy density may decrease.

(6) A layer composed of a conventional inorganic filler may be formed at the interface between the positive electrode and the separator or between the negative electrode and the separator. Examples of the filler that can be used include an oxide that contains one or more selected from titanium, aluminum, silicon, magnesium, and the like, a phosphate compound, and the oxide or phosphate surface-treated with a hydroxide or the like.

The filler layer can be formed by, for example, a method that involves directly applying a filler-containing slurry onto a positive electrode, a negative electrode, or a separator, or by a method that involves bonding a sheet formed of a filler onto a positive electrode, a negative electrode, or a separator.

(7) A conventional separator can be used as the separator used in the present invention. Specifically, a separator composed of polyethylene, a separator including a polyethylene layer and a polypropylene layer on the polyethylene layer, and a polyethylene separator having a surface to which a resin such as an aramid resin is applied can be used as the separator.

INDUSTRIAL APPLICABILITY

The present invention can be expected to be developed as driving power sources of mobile information terminals such as cellular phones, laptop personal computers, and smart phones, and high-output driving power sources for HEVs and power tools.

REFERENCE SIGNS LIST

1: positive electrode
2: negative electrode
3: separator
4: positive electrode current collecting tab
5: negative electrode current collecting tab
6: aluminum laminate outer casing
21: lithium cobaltate particle
22: compound particle containing zirconium and fluorine

The invention claimed is:

1. A positive electrode for a nonaqueous electrolyte secondary battery, the positive electrode comprising a positive electrode active material,
   wherein the positive electrode active material includes a mixture formed from lithium nickel cobalt manganite with no elements adhered thereon and lithium cobaltate having a compound adhered to part of a surface thereof, the compound containing fluorine and at least one selected from zirconium, magnesium, titanium, aluminum, and a rare earth element; and a ratio of the lithium nickel cobalt manganate relative to a total amount of the positive electrode active material is 3% by mass or more and less than 50% by mass.

2. The positive electrode for a nonaqueous electrolyte secondary battery according to claim 1, wherein the ratio of the lithium nickel cobalt manganate relative to the total amount of the positive electrode active material is 5% by mass or more and 40% by mass or less.

3. The positive electrode for a nonaqueous electrolyte secondary battery according to claim 1, wherein the ratio of the lithium nickel cobalt manganate relative to the total amount of the positive electrode active material is 5% by mass or more and 30% by mass or less.

4. The positive electrode for a nonaqueous electrolyte secondary battery according to claim 1, wherein the compound contains fluorine and a rare earth element.

5. The positive electrode for a nonaqueous electrolyte secondary battery according to claim 4, wherein the compound contains fluorine and at least one element selected from erbium, samarium, neodymium, and lanthanum.

6. The positive electrode for a nonaqueous electrolyte secondary battery according to claim 1, wherein the compound contains fluorine and zirconium.

7. The positive electrode for a nonaqueous electrolyte secondary battery according to claim 6, wherein the compound containing fluorine and zirconium contains $ZrF_4$.

8. A nonaqueous electrolyte secondary battery comprising the positive electrode for a nonaqueous electrolyte secondary battery according to claim 1, a negative electrode, and an electrolyte.

9. The positive electrode for a nonaqueous electrolyte secondary battery according to claim 1, wherein the positive electrode active material consists of the lithium nickel cobalt magnate and the lithium cobaltate.

* * * * *